United States Patent
Son et al.

(10) Patent No.: US 10,021,417 B2
(45) Date of Patent: Jul. 10, 2018

(54) METHOD AND DEVICE FOR PROCESSING VIDEO SIGNAL

(71) Applicant: LG Electronics Inc., Seoul (KR)

(72) Inventors: Eunyong Son, Seoul (KR); Jiwook Jung, Seoul (KR); Sehoon Yea, Seoul (KR); Moonmo Koo, Seoul (KR); Jin Heo, Seoul (KR); Taesup Kim, Seoul (KR); Jaewon Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 528 days.

(21) Appl. No.: 14/406,604

(22) PCT Filed: Jun. 18, 2013

(86) PCT No.: PCT/KR2013/005349
§ 371 (c)(1),
(2) Date: Dec. 9, 2014

(87) PCT Pub. No.: WO2013/191436
PCT Pub. Date: Dec. 27, 2013

(65) Prior Publication Data
US 2015/0181230 A1    Jun. 25, 2015

Related U.S. Application Data

(60) Provisional application No. 61/661,797, filed on Jun. 19, 2012.

(51) Int. Cl.
*H04N 19/597* (2014.01)
*H04N 19/513* (2014.01)
(Continued)

(52) U.S. Cl.
CPC ......... *H04N 19/597* (2014.11); *H04N 19/513* (2014.11); *H04N 19/521* (2014.11); *H04N 19/573* (2014.11); *H04N 19/577* (2014.11)

(58) Field of Classification Search
CPC .. H04N 19/597; H04N 19/513; H04N 19/577; H04N 19/573; H04N 19/521
(Continued)

(56) References Cited

U.S. PATENT DOCUMENTS

| | | | |
|---|---|---|---|
| 2008/0013843 A1 | 1/2008 | Choi et al. | |
| 2010/0118939 A1* | 5/2010 | Shimizu | H04N 19/00569 375/240.12 |
| 2013/0176390 A1* | 7/2013 | Chen | H04N 19/597 348/43 |

FOREIGN PATENT DOCUMENTS

| | | |
|---|---|---|
| CN | 1568015 A | 1/2005 |
| CN | 101529918 A | 9/2009 |

(Continued)

OTHER PUBLICATIONS

Schwarz et al.: "Description of 3D Video Coding Technology Proposal by Fraunhofer HHI (HEVC compatible, configuration A)", Nov. 2011), International Organisation for Standardisation, ISO/IEC JTC1/SC29/WG11 Coding of Moving Pictures and Audio, MPEG2011/M22570.*

(Continued)

*Primary Examiner* — Christopher S Kelley
*Assistant Examiner* — Matthew Kwan
(74) *Attorney, Agent, or Firm* — Dentons US LLP

(57) ABSTRACT

The present invention relates to inter-view residual prediction and is characterized by obtaining residual data of a first reference block by using a motion vector of a neighboring block, obtaining residual data of a second reference block by using a reference view motion vector or a disparity vector, obtaining a residual data prediction value by using the residual data of the first reference block and the residual data of the second reference block, and coding a current texture block by using the residual data prediction value. The present invention can perform inter-view residual prediction (Continued)

by using a prediction value obtained using coded data of another view point belonging to the same time band to increase the accuracy of video data prediction by using a correlation between view points and reduce the amount of residual data to be transmitted, thereby improving the coding efficiency. In addition, the complexity in coding process may be reduced by adding a condition for applying the inter-view residual prediction.

18 Claims, 11 Drawing Sheets

(51) Int. Cl.
*H04N 19/577* (2014.01)
*H04N 19/573* (2014.01)
(58) Field of Classification Search
USPC .................................... 375/240.12, 240.15
See application file for complete search history.

(56) References Cited

FOREIGN PATENT DOCUMENTS

| JP | 2007-174649 A | 7/2007 |
|---|---|---|
| KR | 10-2008-0073157 A | 8/2008 |
| KR | 10-2009-0095317 A | 9/2009 |
| KR | 10-2010-0097286 A | 9/2010 |
| KR | 10-2012-0011428 A | 2/2012 |
| RU | 2189120 C2 | 9/2002 |
| RU | 2010132652 A | 2/2012 |

OTHER PUBLICATIONS

C. Bartink, et al.: "HAVC Extension for Multiview Video Coding and Multiview Video plus Depth Coding", 43. VCEG Meeting; 97. MPEG Meeting; Jul. 17-22, 2011; Torino; (Video Coding Experts Group of ITU-T SG.16), No. VCEG-AR13; 44. Meeting, San Jose, CA, USA Feb. 3-10, 2012, XP030003856, *Section 3.2*.
Y. Chang, et al.: "CE1.h: Depth-oriented Neighboring Block Disparity Vector (DoNBDV) with virtual depth retrieval", 103. MPEG Meeting; 3rd Meeting, Geneva, CH, Jan. 17-23, 2013; (Motion Picture Expert Group, ITU-T SG 16 WP 3 and ISO/IEC JTC1/SC 29/WG11), No. m27882, Jan. 17, 2013, XP030056435, * the whole document*.
Y. Chang, et al.: "CE5.h related: Depth-oriented Neighboring Block Disparity Vector (DoNBDV) with virtual depth retrieval", 102. MPEG Meeting; 2nd Meeting, Shanghai, CN, Oct. 13-19, 2012; (Motion Picture Expert Group, ITU-T SG 16 WP 3 and ISO/IEC JTC1/SC29/ WG11), No. m26830, Oct. 11, 2012, XP030055160, * the whole document *.
L. Zhang, et al.: "3D-CE5.h related: Advanced residual prediction for multiview coding", Joint Collaborative Team on 3D Video Coding Extension Development of ITU-TSG 16 WP 3 and SO/IEC JTC 1/SC 29/WG 11, 2nd Meeting: Shanghai, CN, Oct. 13-19, 2012, JCT3V-B0051.

* cited by examiner

FIG. 2
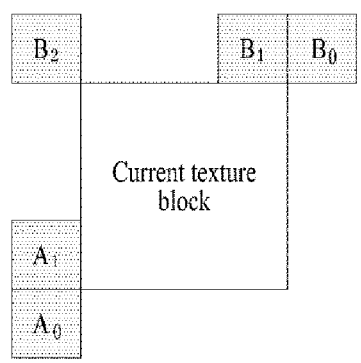
(a)
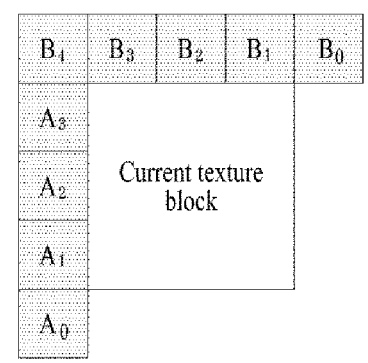
(b)

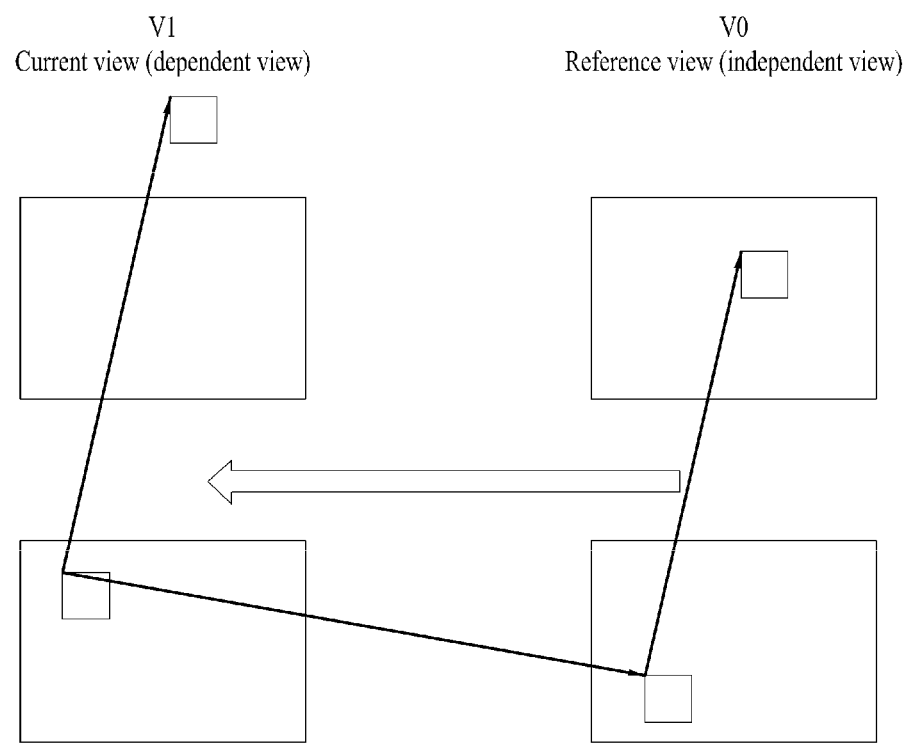

METHOD AND DEVICE FOR PROCESSING VIDEO SIGNAL

This Application is a 35 U.S.C. § 371 National Stage entry of International Application No. PCT/KR2013/005349, filed Jun. 18, 2013, which claims benefit of Provisional Application No. 61/661,797 filed Jun. 19, 2012, both of which are incorporated by reference in their entirety herein.

TECHNICAL FIELD

The present invention relates to a method and a device for processing a video signal.

BACKGROUND ART

Compression refers to a signal processing technique for transmitting digital information through a communication line or storing the digital information in a form suitable for a storage medium. Subjects of compression include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention relates to inter-view residual prediction and obtains a motion vector from a neighboring block.

The present invention obtains residual data of a first reference block by using a motion vector of a neighboring block and obtains residual data of a second reference block by using a reference view motion vector or a disparity vector.

The present invention obtains a residual data prediction value of a current texture block by using the residual data of the first reference block and the residual data of the second reference block and codes the current texture block by using the residual data prediction value of the current texture block.

The present invention applies inter-view residual prediction when the second reference block detected using the reference view motion vector is located within a picture.

The present invention applies inter-view residual prediction when a corresponding block corresponds to inter prediction.

The present invention compares an inter-view motion vector for detecting the corresponding block with a disparity vector using depth data corresponding to the current texture block and applies inter-view residual prediction when the difference between the inter-view motion vector and the disparity vector is less than a threshold value.

The present invention compares a temporal motion vector of a neighboring block with the inter-view motion vector for detecting the corresponding block and applies inter-view residual prediction when the difference between the temporal motion vector and the inter-view motion vector is less than a threshold value.

Advantageous Effects

The present invention can improve video data prediction accuracy using correlation between views by performing inter-view residual prediction using a residual data prediction value of the current texture block, which is obtained using coded data of a different view belonging to the same time period, and increase coding efficiency by reducing the quantity of transmitted residual data. In addition, the present invention can obtain a motion vector for detecting the first reference block and the second reference block from a neighboring block of the current texture block, to thereby improve inter-view residual prediction accuracy and video coding efficiency. Furthermore, the present invention can reduce complexity in a coding process by adding conditions for applying inter-view residual prediction.

DESCRIPTION OF DRAWINGS

FIGS. 2a and b illustrate exemplary spatial neighboring blocks according to an embodiment to which the present invention is applied.

FIG. 11 illustrates exemplary inter-view residual prediction conditions according to the position of a first reference block searched using a reference view motion vector.

BEST MODE

Figure 1:
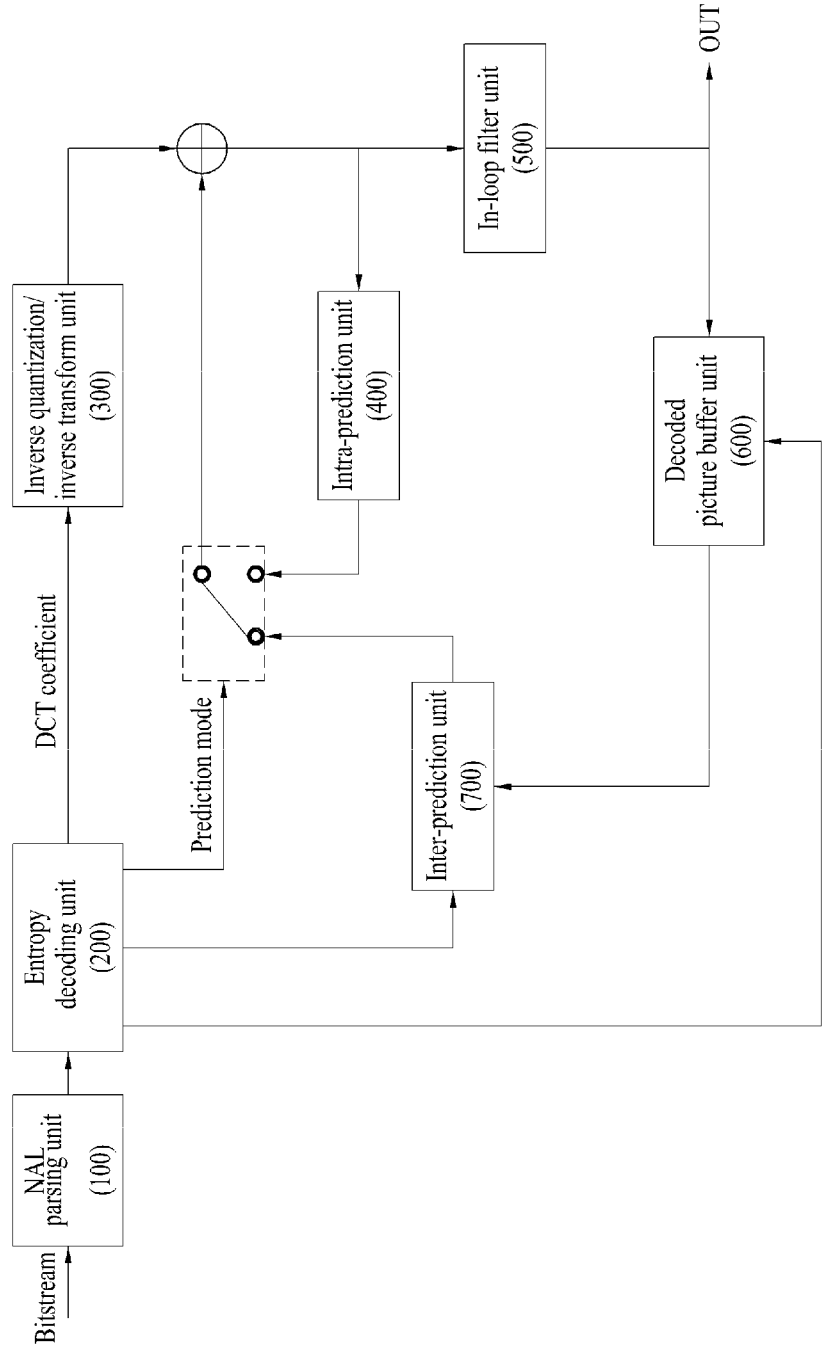
FIG. 1 is a block diagram of a video decoder according to an embodiment to which the present invention is applied.

To accomplish the objects of the present invention, a method for processing a video signal according to the present invention may obtain an inter-view motion vector from a neighboring block of a current texture block, the neighboring block being coded according to inter-view inter prediction, obtain a reference view motion vector of a corresponding block using the inter-view motion vector, obtain residual data of a first reference block using the reference view motion vector of the corresponding block, obtain the reference view motion vector of the corresponding block as a reference view motion vector of the current texture block, obtain residual data of a second reference block using the reference view motion vector of the current texture block, obtain a residual data prediction value using the residual data of the first reference block and the residual data of the second reference block, and decode the current texture block using the residual data prediction value.

When the second reference block is not located in the second reference picture, the residual data of the second reference block may be derived as 0.

The method for processing a video signal according to the present invention may obtain a disparity vector using a depth value of the current texture block, compare the inter-view motion vector with the disparity vector, and obtain the residual data of the first reference block and the residual data of the second reference block when a difference between the inter-view motion vector and the disparity vector is less than a threshold value.

The method for processing a video signal according to the present invention may obtain a temporal motion vector from the neighboring block of the current texture block, the neighboring block being coded by temporal inter prediction, and compare the temporal motion vector with the reference view motion vector, wherein the residual data of the first reference block and the residual data of the second reference block are obtained when a difference between the temporal motion vector and the reference view motion vector is less than a threshold value.

The inter-view motion vector may be derived from at least one of an inter-view motion vector of a spatial neighboring block, an inter-view motion vector of a temporal neighboring block and a reference inter-view motion vector.

The inter-view motion vector of the spatial neighboring block may have higher priority than the inter-view motion vector of the temporal neighboring block, and the inter-view motion vector of the temporal neighboring block may have higher priority than the reference inter-view motion vector.

The reference inter-view motion vector may be an inter-view motion vector corresponding to a reference view motion vector when at least one of the spatial neighboring block and the temporal neighboring block is derived using the reference view motion vector.

Modes for Invention

Techniques of compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include encoding and decoding in the specification and can be flexibly interpreted in the technical spirit and technical scope of the present invention.

FIG. 1 is a block diagram of a video decoder according to an embodiment to which the present invention is applied.

Referring to FIG. 1, the video decoder may include a NAL parsing unit 100, an entropy decoding unit 200, an inverse quantization/inverse transform unit 300, an intra-prediction unit 400, an in-loop filter unit 500, a decoded picture buffer unit 600 and an inter prediction unit 700. The NAL parsing unit 100 may receive a bitstream including multiview texture data. In addition, the NAL parsing unit 100 may further receive a bitstream including encoded depth data when the depth data is necessary for texture data coding. The input texture data and depth data may be transmitted as one bitstream or as separate bitstreams. The NAL parsing unit 100 may perform parsing on an NAL basis in order to decode the input bitstream. When the input bitstream is multiview related data (e.g. 3-dimensional video), the input bitstream may further include a camera parameter. The camera parameter may include an intrinsic camera parameter and an extrinsic camera parameter, and the intrinsic camera parameter may include a focal length, an aspect ratio, a principal point and the like and the extrinsic camera parameter may include camera position information in the global coordinate system and the like.

The entropy decoding unit 200 may extract a quantized transform coefficient, coding information for texture picture prediction and the like through entropy decoding.

The inverse quantization/inverse transform unit 300 may obtain a transform coefficient by applying a quantization parameter to the quantized transform coefficient and decode the texture data or the depth data by inversely transforming the transform coefficient. Here, the decoded texture data or depth data may include residual data according to prediction. In addition, a quantization parameter for a depth block may be obtained in consideration of complexity of the texture data. For example, a low quantization parameter can be set when a texture block corresponding to the depth block has a high complexity and a high quantization parameter can be set when the texture block has a low complexity.

The intra-prediction unit 400 may perform intra-prediction using reconstructed texture data in the current texture picture. Intra-prediction may be performed for the depth picture in the same manner as that for the texture picture. For example, coding information used for inter prediction of the texture picture can be equally used for the depth picture. The coding information used for inter prediction may include an intra-prediction mode and partition information of intra-prediction.

The in-loop filter unit 500 may apply an in-loop filter to each coded block in order to reduce block distortion. The filter may smooth the edge of a block so as to improve the quality of a decoded picture. Filtered texture pictures or depth pictures may be output or stored in the decoded picture buffer unit 600 to be used as reference pictures.

The decoded picture buffer unit 600 may store or open previously coded texture pictures or depth pictures in order to perform inter prediction. To store previously coded texture pictures or depth pictures in the decoded picture buffer unit 600 or to open the pictures, frame_num and a picture order count (POC) of each picture may be used. Furthermore, since the previously coded pictures include depth pictures corresponding to views different from the view of the current depth picture in depth coding, view identification information for identifying a depth picture view may be used in order to use the depth pictures corresponding to different views as reference pictures. In depth coding, depth pictures may be marked to be discriminated from texture pictures in the decoded picture buffer unit and information for identifying each depth picture may be used during the marking process.

The inter prediction unit 700 may perform motion compensation of a current block using reference pictures and motion information stored in the decoded picture buffer unit 600. The motion information may include a motion vector and reference index information in a broad sense in the specification. In addition, the inter prediction unit 700 may perform temporal inter prediction for motion compensation.

In the present invention neighboring blocks may include a spatial neighboring block and a temporal neighboring block. The spatial neighboring block and the temporal neighboring block applied to the present invention are defined in the following.

FIG. 2 illustrates exemplary spatial neighboring blocks according to an embodiment to which the present invention is applied.

Referring to FIG. 2(a), spatial neighboring blocks may include at least one of a left lower neighboring block $A_0$, a left neighboring block $A_1$, a right upper neighboring block $B_0$, an upper neighboring block $B_1$ and a left upper neighboring block $B_2$. The aforementioned spatial neighboring blocks may be searched for a block for deriving a motion vector and the searched motion vector of the neighboring block may be obtained as a motion vector of the current texture block. The spatial neighboring blocks may be searched in consideration of priorities thereof. Accordingly, the spatial neighboring blocks may be searched in the order of the left neighboring block, upper neighboring block, upper right neighboring block, lower left neighboring block and upper left neighboring block. For example, when an inter-view motion vector of the current texture block is derived from a neighboring block, if the left neighboring block is a block coded according to inter-view inter prediction, then the inter-view motion vector of the left neighboring block can be obtained as the inter-view motion vector of the current texture block and searching can be finished. However, when the left neighboring block has not been coded according to inter-view inter prediction, it can be checked whether the upper neighboring block has been coded according to inter-view inter prediction. Alternatively, the spatial neighboring blocks may be searched in the order of the left lower neighboring block, left neighboring block, right upper neighboring block, upper neighboring block and left upper neighboring block for a block coded according to inter-view inter prediction. However, priorities of the spatial neighboring blocks are not limited to the above-described embodiment.

FIG. 2(b) illustrates an expansion of spatial neighboring block candidates. When the size of the left neighboring block $A_1$ is less than the size of the current texture block, the current texture block may further have at least one left neighboring block. For example, the spatial neighboring blocks according to the present invention can further include left neighboring blocks $A_2$ and $A_3$ located between the left neighboring block $A_1$ and the left upper neighboring block $B_4$, as shown in FIG. 2(b). In the same manner, the spatial neighboring blocks according to the present invention can further include upper neighboring blocks $B_2$ and $B_3$ located between the upper neighboring block $B_1$ and the left upper neighboring block $B_4$ when the size of the upper neighboring block $B_1$ is less than the size of the current texture block. In this case, a block coded according to inter-view inter prediction may also be detected in consideration of priorities of the spatial neighboring blocks (e.g. $A_1 \rightarrow B_1 \rightarrow B_0 \rightarrow A_0 \rightarrow B_2 \rightarrow C_0 \rightarrow C_1 \rightarrow D_0 \rightarrow D_1$). As described above, it is possible to increase the probability that the inter-view motion vector of the current texture block can be obtained by expanding spatial neighboring block candidates for deriving the inter-view motion vector of the current texture block.

Figure 3:
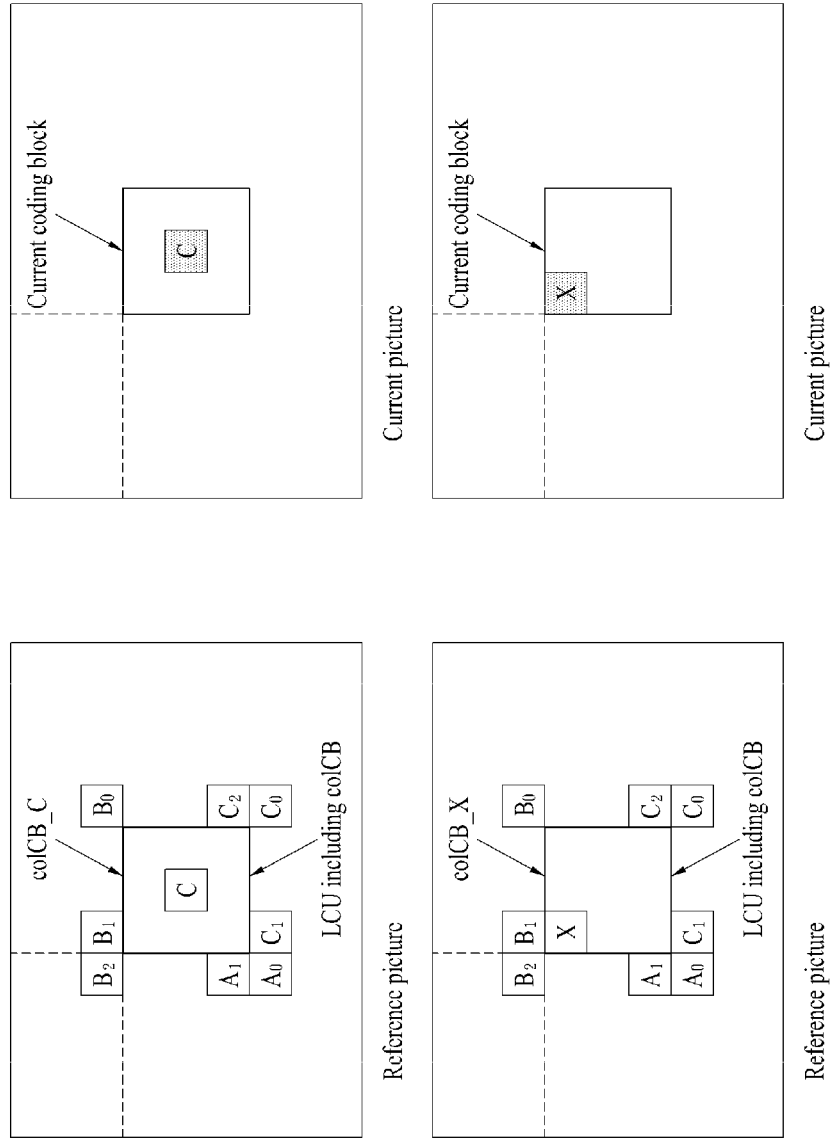
FIG. 3 illustrates exemplary temporal neighboring blocks according to an embodiment to which the present invention is applied.

FIG. 3 illustrates exemplary temporal neighboring blocks according to an embodiment to which the present invention is applied.

Referring to FIG. 3, a temporal neighboring block may refer to a block (referred to as a collocated block hereinafter) in the same position as the current texture block within a reference picture of the current texture block. Here, the reference picture may refer to a picture corresponding to the same view as the current picture including the current texture block while corresponding to a different time. The collocated block according to the present invention may be defined through two methods, as shown in FIG. 4.

Referring to FIG. 3(a), the collocated block may be defined as a block including the position C in the reference picture, which corresponds to the position C of the center pixel of the current texture block. Referring to FIG. 3(b), the collocated block may be defined as a block including the position X in the reference picture, which corresponds to the position X of the left upper pixel of the current texture block. The temporal neighboring block of the present invention is not limited to the collocated block and may refer to a neighboring block adjacent to the collocated block. As shown in FIG. 3(a), at least one of the left lower neighboring block $A_0$, left block $A_1$, right upper neighboring block $B_0$, upper block $B_1$ and left upper neighboring block $B_2$ may be used as the neighboring block adjacent to the collocated block. Furthermore, since the reference picture has been decoded prior to the current picture, a lower neighboring block and a right neighboring block of the collocated block may also be used as temporal neighboring blocks. For example, a right lower neighboring block $C_0$, a lower neighboring block $C_1$ and a right neighboring block $C_2$ can be used as temporal neighboring blocks, as shown in FIG. 3(a). It is possible to search a) a collocated block and b) a neighboring block adjacent to the collocated block, which are regarded as temporal neighboring block candidates, for a temporal neighboring block in consideration of priority.

Figure 4:
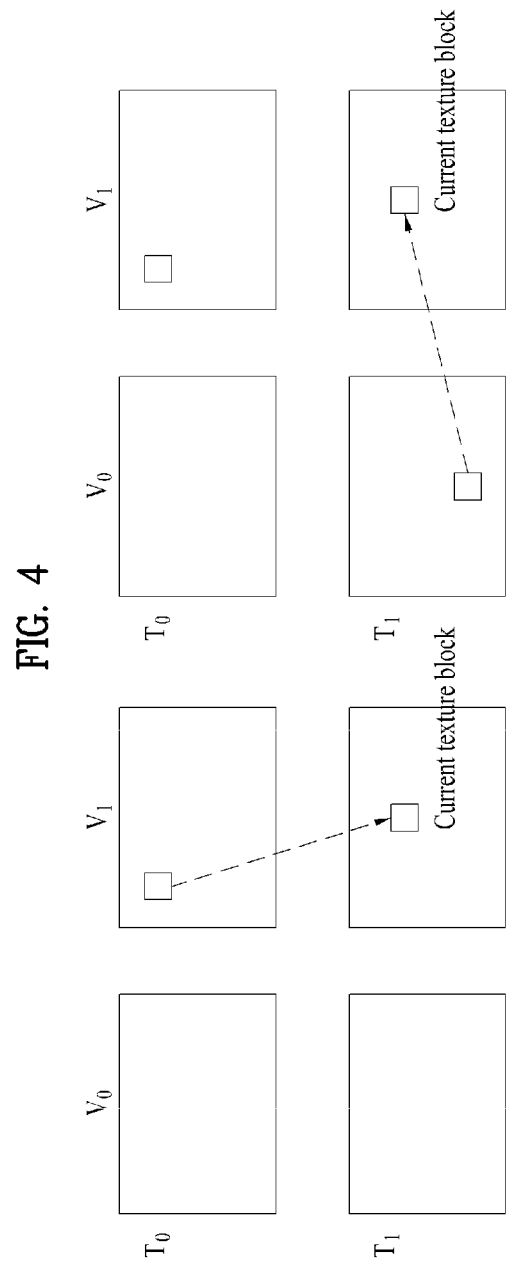
FIG. 4 illustrates examples of temporal inter prediction and inter-view inter prediction according to an embodiment to which the present invention is applied.

FIG. 4 illustrates examples of motion compensated prediction and disparity compensated prediction according to an embodiment to which the present invention is applied.

Temporal inter prediction (motion compensated prediction (MCP)) may refer to inter prediction using a reference picture, which corresponds to the same view as that of the current texture block while being located in a time period different from that of the current texture block, and motion information of the current texture block. In the case of a multiview image obtained using a plurality of cameras, inter-view inter prediction may be performed in addition to motion compensated prediction. Inter-view inter prediction or disparity compensated prediction (DCP) may refer to inter prediction using a reference picture corresponding to a view different from that of the current texture block and the motion information of the current texture block. For convenience, motion information used for motion compensated prediction is referred to as a temporal motion vector and temporal reference index information and motion information used for disparity compensated prediction is referred to as an inter-view motion vector and inter-view reference index information. Accordingly, motion vector can be flexibly interpreted as the concept including the temporal motion vector, temporal reference index information, inter-view motion vector and inter-view reference index information.

Residual prediction may be a method for predicting residual data of the current texture block using residual data of a reference picture. Inter-view residual prediction may be a method for predicting residual data of the current texture block using residual data of a reference block within a reference view. Inter-view residual prediction will be described in detail with reference to FIG. 6.

A description will be given of methods for determining whether a neighboring block has been coded according to temporal inter prediction or inter-view inter prediction.

A method for determining whether a neighboring block has been coded according to temporal inter prediction will now be described. In one embodiment, whether a neighboring block has been coded according to temporal inter prediction may be determined on the basis of motion vector identification information of the neighboring block. When the motion vector identification information indicates a motion vector using temporal inter prediction, it can be determined that the neighboring block has been coded according to temporal inter prediction.

A description will be given of a method for determining whether the above-defined spatial neighboring block and temporal neighboring block are coded according to inter-view inter prediction. In one embodiment, it is possible to determine whether a neighboring block is coded according to inter-view inter prediction on the basis of whether the corresponding neighboring block uses an inter-view reference picture list. The inter-view reference picture list may refer to a list composed of reference pictures positioned at views different from the view of the corresponding neighboring block. Alternatively, it may be determined whether a neighboring block is coded according to inter-view inter prediction on the basis of reference index information of the corresponding neighboring block. For example, when the reference index information of the corresponding neighboring block specifies a reference picture located at a view different from that of the corresponding neighboring block, it can be specified that the corresponding neighboring block is coded according to inter-view inter prediction. Alternatively, it may be determined whether a neighboring block is coded according to inter-view inter prediction on the basis of whether POC of a picture including the corresponding neighboring block is identical to POC of a reference picture of the corresponding neighboring block. POC is output sequence information and pictures in the same access unit may have the same POC. Accordingly, when the two POCs are identical, this means that the picture including the corresponding neighboring block and the reference picture are located at different views. In this case, it can be specified that the corresponding neighboring block is coded according to inter-view inter prediction.

When both a spatial neighboring block and a temporal neighboring block are not coded according to inter-view inter prediction, an inter-view motion vector may be derived using a neighboring block coded according to temporal inter prediction. When the neighboring block is coded according to temporal inter prediction using a reference view motion vector, an inter-view motion vector (referred to as a reference inter-view motion vector hereinafter) used to determine the reference view motion vector may be set to an inter-view motion vector of the current texture block.

Figure 5:
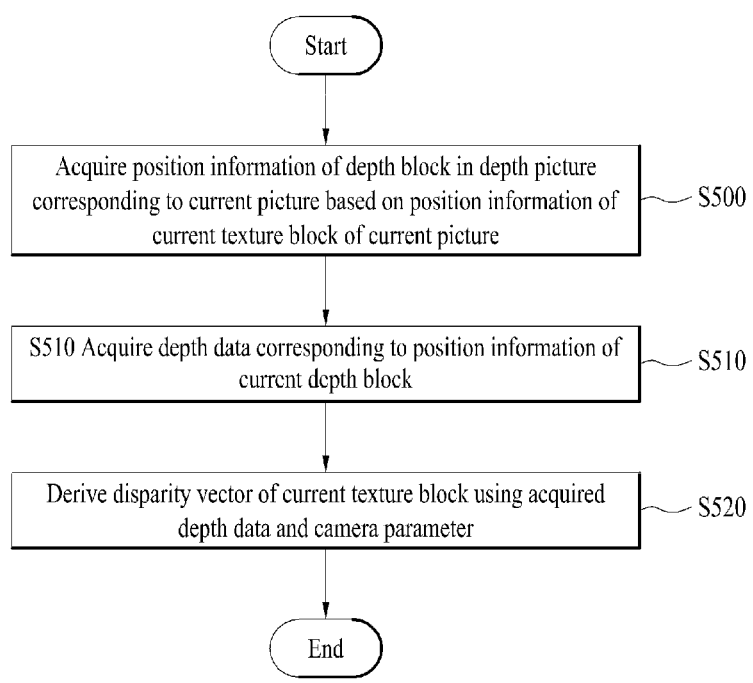
FIG. 5 is a flowchart illustrating a method for deriving a disparity vector of a current texture block using depth data according to an embodiment to which the present invention is applied.

FIG. 5 is a flowchart illustrating a method of deriving a disparity vector of the current texture block using depth data according to an embodiment to which the present invention is applied.

Referring to FIG. 5, position information of a depth block (referred to as a current depth block hereinafter) in a depth picture, which corresponds to the current texture block of the current picture, may be obtained on the basis of position information of the current texture block of the current picture (S500). The position of the current depth block may be determined in consideration of spatial resolutions of the depth picture and the current picture. For example, when the depth picture and the current picture are coded in the same spatial resolution, the position of the current depth block can be determined as the same position as the current texture block of the current picture. The current picture and the depth picture may be coded in different spatial resolutions since coding efficiency is not remarkably deteriorated even when depth information is coded in decreased spatial resolution in terms of characteristics of the depth information indicating a distance between a camera and an object. Accordingly, when the depth picture is coded in spatial resolution lower than that of the current picture, the decoder may upsample the depth picture prior to acquisition of the position information of the current depth block. In addition, when the aspect ratio of the upsampled depth picture is not consistent with the aspect ratio of the current picture, offset information may be additionally considered when the position information of the current depth block is obtained within the upsampled depth picture. Here, the offset information may include at least one of upper offset information, left offset information, right offset information and lower offset information. The upper offset information may refer to a position difference between at least one pixel located at the top of the upsampled depth picture and at least one pixel located at the top of the current picture. The left offset information, right offset information and lower offset information may be defined in the same manner.

Depth data corresponding to the position information of the current depth block may be obtained (S510). When the current depth block includes a plurality of pixels, depth data corresponding to a corner pixel of the current depth block may be used. Otherwise, depth data corresponding to a center pixel of the current depth block may be used. Alternatively, one of a maximum value, minimum value and mode, from among a plurality of pieces of depth data corresponding to the plurality of pixels, may be selectively used and a mean of the plurality of pieces of depth data may be used. The disparity vector of the current texture block may be derived using the obtained depth data and a camera parameter (S520). A detailed method of deriving the disparity vector of the current texture block will now be described with reference to Equations 1 and 2.

$$Z = \frac{1}{\frac{D}{255}S\left(\frac{1}{Z_{near}} - \frac{1}{Z_{far}}\right) + \frac{1}{Z_{far}}} \quad \text{[Equation 1]}$$

Referring to Equation 1, Z denotes a distance between a corresponding pixel and a camera, D is a value obtained by quantizing Z and corresponds to depth data of the present invention, and $Z_{near}$ and $Z_{far}$ respectively represent a minimum value and a maximum value of Z defined for a view including the depth picture. $Z_{near}$ and $Z_{far}$ may be extracted from a bitstream through a sequence parameter set, a slice header and the like and may be information predetermined in the decoder. Accordingly, when the distance between the corresponding pixel and the camera is quantized at a level of 256, Z can be reconstructed using depth data $Z_{near}$ and $Z_{far}$ as represented by Equation 1. Subsequently, the disparity vector for the current texture block may be derived using reconstructed Z, as represented by Equation 2.

$$d = \frac{fSB}{2} \quad \text{[Equation 2]}$$

In Equation 2, f denotes the focal length of a camera and B denotes a distance between cameras. It can be assumed that all cameras have the same f and B, and thus f and B may be information predefined in the decoder.

When only texture data of a multiview image is coded, information about camera parameters cannot be used and thus the method of deriving a disparity vector from depth data cannot be used. Accordingly, a disparity vector map storing disparity vectors may be used when only texture data of a multiview image is coded. The disparity vector map may be a map in which disparity vectors, each of which is composed of horizontal components and vertical components, are stored in a two-dimensional array. The disparity vector map of the present invention may be represented in various sizes. For example, the disparity vector map can have a size of 1×1 when only one disparity vector is used per picture. When a disparity vector is used per 4×4 block in a picture, the disparity vector map can have a size corresponding to 1/16 of the picture size since the disparity vector map has a width and a height of 1/4 of those of the picture. In addition, the size of the current texture block may be adaptively determined in one picture and a disparity vector may be stored per corresponding texture block.

A description will be given of a method for inter-view prediction of the current texture block in the inter prediction unit 700, particularly, an inter-view residual prediction method for obtaining a residual data prediction value using residual data of a reference block.

Figure 6:
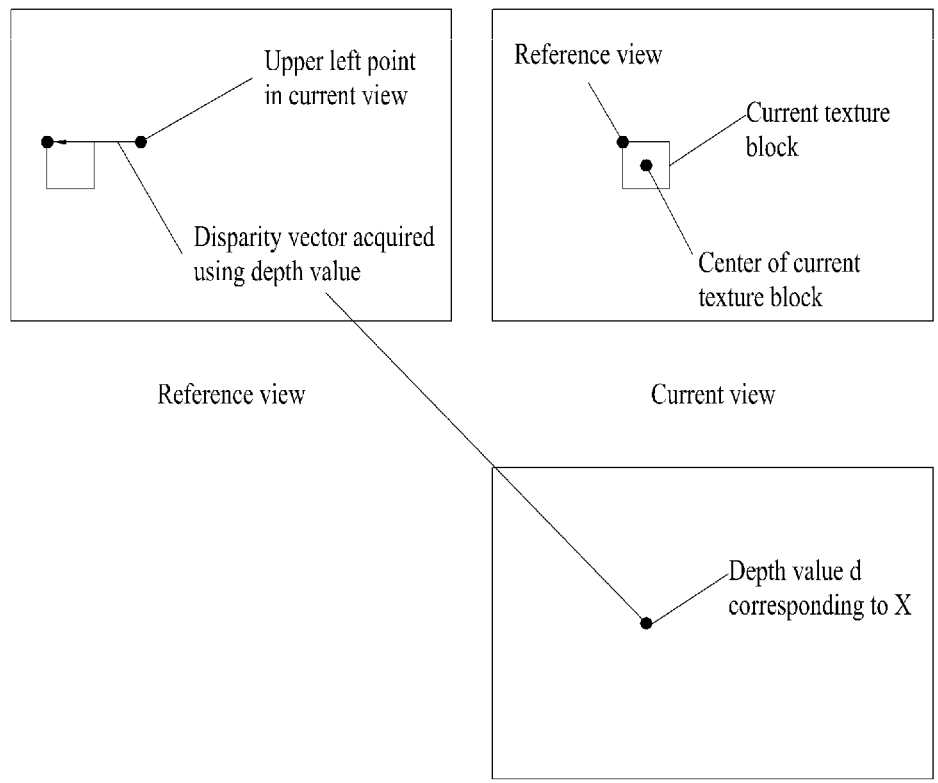
FIG. 6 illustrates an example of inter-view residual prediction according to an embodiment to which the present invention is applied.

FIG. 6 illustrates exemplary inter-view residual prediction according to an embodiment to which the present invention is applied.

Inter-view residual prediction is a method of obtaining a residual data prediction value of the current texture block using residual data, which corresponds to a view different from that of the current texture block while belonging to the same time period as that of the current texture block, in a multiview image. Current view video coding efficiency can be improved by predicting residual data of the current texture block using inter-view residual prediction. In FIG. 6, when the center of the current texture block is X, a disparity vector of the current texture block is obtained using a depth value d of the current texture block, which corresponds to X. Here, the disparity vector indicates a reference block of the current texture block. The reference block of the current texture block can be detected from a reference view using the obtained disparity vector. In other words, the position of the reference block in the reference view can be detected by adding the disparity vector value to the upper left point of the current texture block. When residual data is present in the reference block, only a difference between the residual data corresponding to the reference block and residual data of the current texture block is transformed so as to improve coding efficiency. When the position of a reference view block, indicated by the disparity vector, corresponds to a sub-sample position, the residual data prediction value can be obtained using residual data samples of the reference view and a linear filter.

A flag inter_view_residual_prediction_flag indicating whether inter-view residual prediction is applied to the current texture block may be included in a bitstream and transmitted to a decoder. Inter_view_residual_prediction_flag may be set to 1 upon determining that inter-view residual prediction of the current texture block is efficient, whereas inter_view_residual_prediction_flag may be set to 0 upon determining that inter-view residual prediction of the current texture block is not efficient.

Figure 7:
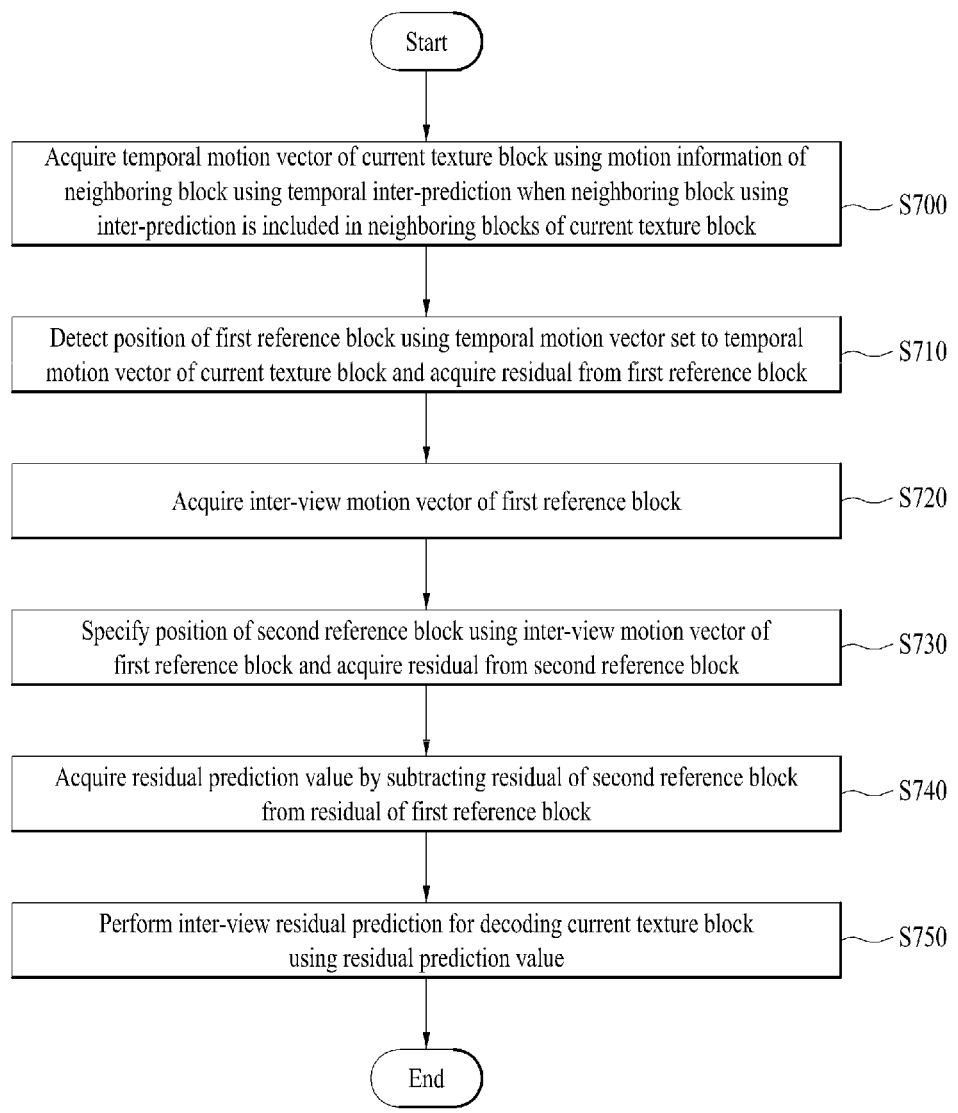
FIG. 7 is a flowchart illustrating exemplary inter-view residual prediction according to an embodiment to which the present invention is applied.

FIG. 7 is a flowchart illustrating exemplary inter-view residual prediction according to an embodiment to which the present invention is applied.

Figure 8:
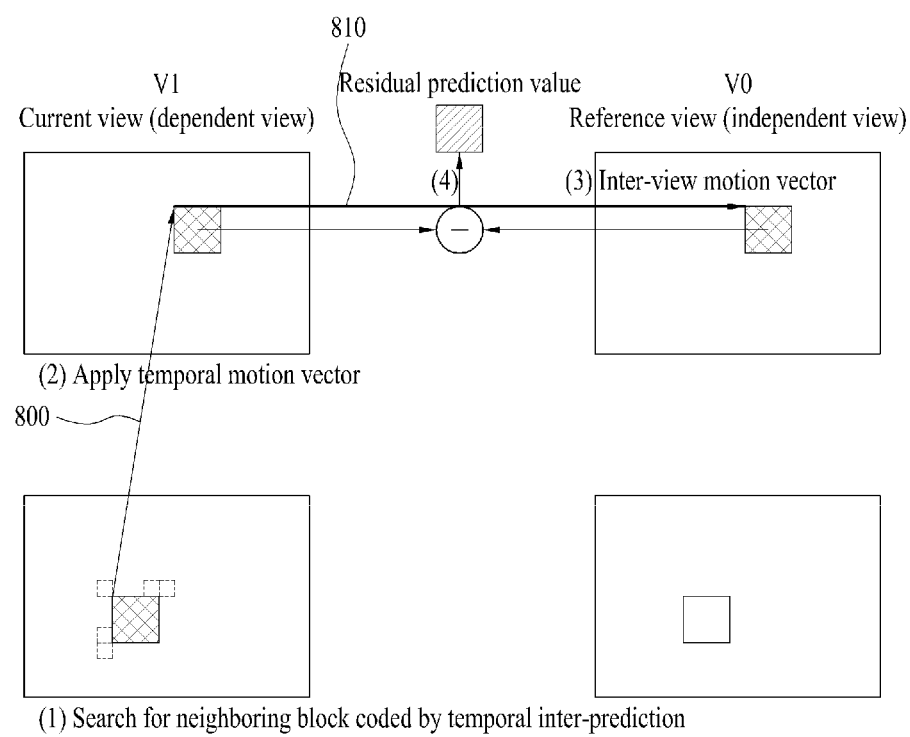
FIG. 8 illustrates an example of inter-view residual prediction corresponding to the flowchart of FIG. 7 according to an embodiment to which the present invention is applied.

FIG. 8 illustrates exemplary inter-view residual prediction corresponding to the flowchart of FIG. 7.

As shown in FIG. 8, when neighboring blocks of the current texture block include a neighboring block using temporal inter prediction, a temporal motion vector 800 of the current texture block can be obtained from motion information of the neighboring block (S700). Neighboring blocks may include spatial neighboring blocks and temporal neighboring blocks. The spatial neighboring blocks may include at least one of a lower left neighboring block, a left neighboring block, an upper right neighboring block, an upper neighboring block and an upper left neighboring block, which are neighboring blocks of the current texture block. When a spatial neighboring block is coded using temporal inter prediction, a temporal motion vector may be obtained from the spatial neighboring block as the temporal motion vector 800 of the current texture block. When a temporal neighboring block is coded by temporal inter prediction, a temporal motion vector may be obtained from the temporal neighboring block as the temporal motion vector 800 of the current texture block. Neighboring blocks may be searched for a block coded according to temporal inter prediction in consideration of priorities of the neighboring blocks. Spatial neighboring blocks may be searched first and then temporal neighboring blocks may be searched. Otherwise, temporal neighboring blocks may be searched first and then spatial neighboring blocks may be searched. It is possible to search for a block coded according to temporal inter prediction in consideration of priorities of spatial neighboring blocks. Priorities of spatial neighboring blocks may be given in the order of the left neighboring block, upper neighboring block, upper right neighboring block, lower left neighboring block and upper left neighboring block.

The position of a first reference block may be detected using the temporal motion vector 800 obtained as the temporal motion vector of the current texture block and residual data may be obtained from the first reference block (S710). The position of the first reference block may be detected using the temporal motion vector 800 in the current texture block. The upper left point of the first reference block may be detected by adding the temporal motion vector 800 to the upper left point of the current texture block. The first reference block may be located in a picture which corresponds to the same view as that of the current texture block while belonging to a time period different from that of the current texture block.

An inter-view motion vector 810 of the first reference block may be obtained (S720). The inter-view motion vector 810 of the first reference block may be a disparity vector obtained using depth data corresponding to the first reference block. An inter-view motion vector of a block coded according to inter-view inter prediction, from among neighboring blocks of the first reference block, may be obtained as the inter-view motion vector 810 of the first reference block. Neighboring blocks may include spatial neighboring blocks and temporal neighboring blocks. The spatial neighboring blocks may include at least one of a lower left neighboring block, a left neighboring block, an upper right neighboring block, an upper neighboring block and an upper left neighboring block, which are neighboring blocks of the current texture block. When a spatial neighboring block is coded by inter-view inter prediction, an inter-view motion vector may be obtained from the spatial neighboring block as the inter-view motion vector 810 of the current texture block. When a temporal neighboring block is coded by inter-view inter prediction, an inter-view motion vector may be obtained from the temporal neighboring block as the inter-view motion vector 810 of the current texture block. Neighboring blocks may be searched for a block coded according to inter-view inter prediction in consideration of priorities of the neighboring blocks.

The position of a second reference block may be specified using the inter-view motion vector 810 of the first reference block and residual data may be obtained from the second reference block (S730). The second reference block may be located in a picture, which corresponds to a view different from that of the first reference block while belonging to the same time as the first reference block. The position of the second reference block may be detected using the inter-view motion vector 810. The upper left point of the second reference block may be specified by adding the inter-view motion vector 810 to the upper left point of the first reference block.

A residual data prediction value may be obtained by subtracting the residual data of the second reference block from the residual data of the first reference block (S740).

Inter-view residual prediction for decoding the current texture block may be performed using the residual data prediction value (S750).

Figure 9:
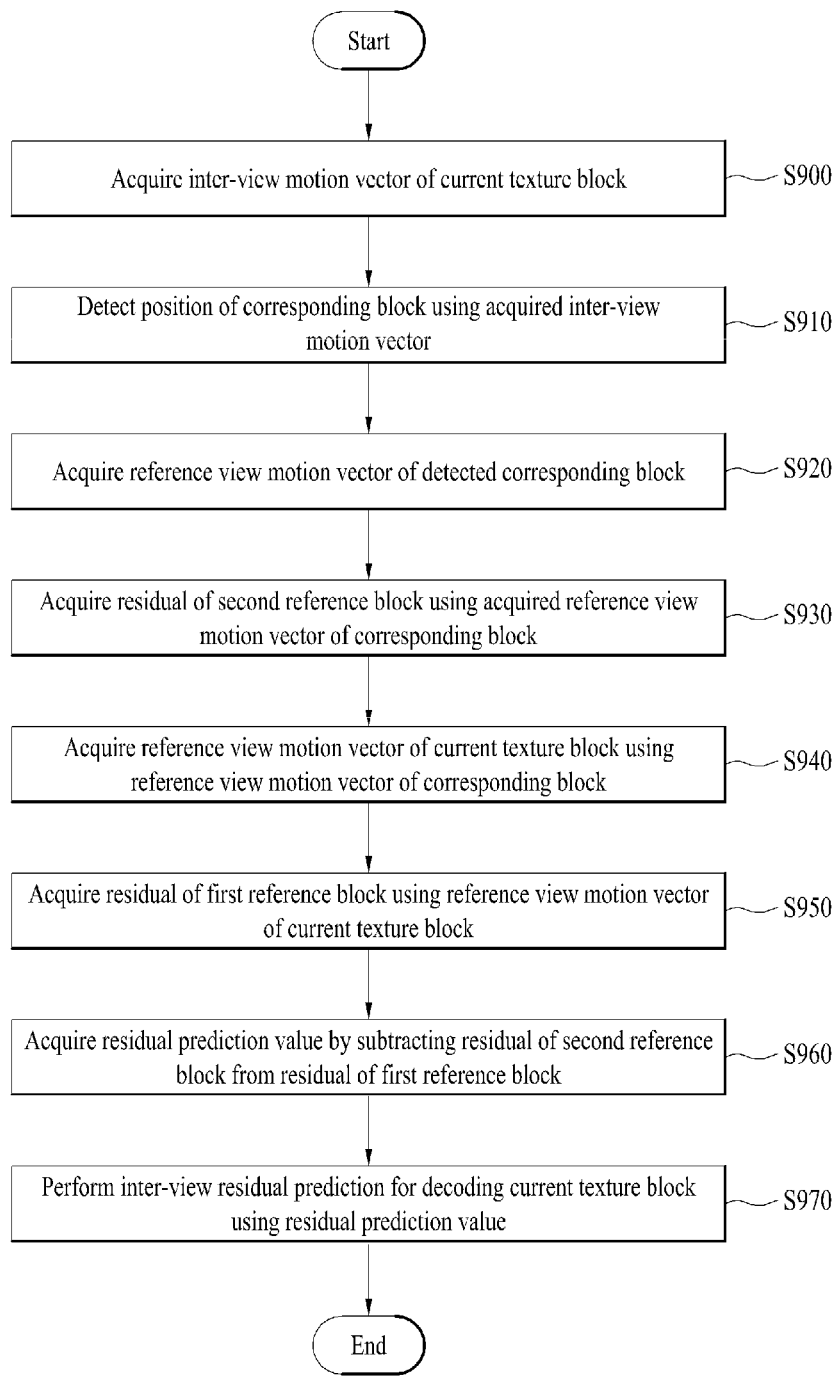
FIG. 9 is a flowchart illustrating exemplary inter-view residual prediction according to an embodiment to which the present invention is applied.

FIG. 9 is a flowchart illustrating exemplary inter-view residual prediction according to an embodiment to which the present invention is applied.

Figure 10:
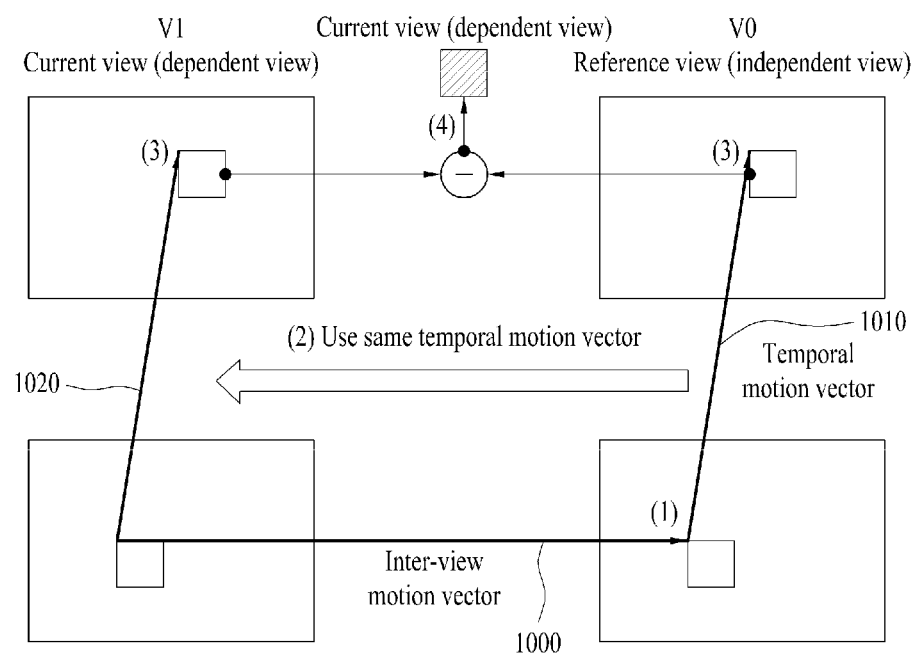
FIG. 10 illustrates an example of inter-view residual prediction corresponding to the flowchart of FIG. 9 according to an embodiment to which the present invention is applied.

FIG. 10 illustrates exemplary inter-view residual prediction corresponding to the flowchart of FIG. 9.

An inter-view motion vector of the current texture block may be obtained (900). The inter-view motion vector 1000 of the current texture block may be obtained from a neighboring block of the current texture block. When neighboring blocks of the current texture block include a block coded using an inter-view motion vector, the inter-view motion vector of the block may be obtained as the inter-view motion vector 1000 of the current texture block. Neighboring blocks may include spatial neighboring blocks and temporal neighboring blocks. The spatial neighboring blocks may include at least one of a lower left neighboring block, a left neighboring block, an upper right neighboring block, an upper neighboring block and an upper left neighboring block, which are neighboring blocks of the current texture block. When a spatial neighboring block is coded by inter-view inter prediction, an inter-view motion vector may be obtained from the spatial neighboring block as the inter-view motion vector 1000 of the current texture block. When a temporal neighboring block is coded by inter-view inter prediction, an inter-view motion vector may be obtained from the temporal neighboring block as the inter-view motion vector 1000 of the current texture block. Neighboring blocks may be searched for a block coded according to inter-view inter prediction in consideration of priorities of the neighboring blocks.

The position of a corresponding block may be detected using the obtained inter-view motion vector (S910). The position of an upper left sample of the corresponding block may be determined by adding the inter-view motion vector obtained in step S900 to the position of an upper left sample of the current texture block. The corresponding block may be located in a view different from that of the current texture block while belonging to the same time period as that of the current texture block.

A reference view motion vector 1010 of the searched corresponding block may be obtained (S920). The reference view motion vector 1010 of the corresponding block may be obtained from a neighboring block of the corresponding block. When neighboring blocks of the corresponding block include a neighboring block coded using temporal inter prediction, a temporal motion vector used for temporal inter prediction of the neighboring block may be obtained as the reference view motion vector 1010 of the corresponding block. Neighboring blocks may include spatial neighboring blocks and temporal neighboring blocks. The spatial neighboring blocks may include at least one of a lower left neighboring block, a left neighboring block, an upper right neighboring block, an upper neighboring block and an upper left neighboring block, which are neighboring blocks of the corresponding block. When a spatial neighboring block is coded by temporal inter prediction, a temporal motion vector may be obtained from the spatial neighboring block as the reference view motion vector 1010 of the corresponding block. When a temporal neighboring block is coded by temporal inter prediction, a temporal motion vector may be obtained from the temporal neighboring block as the reference view motion vector 1010 of the corresponding block. Neighboring blocks may be searched for a block coded according to temporal inter prediction in consideration of priorities of the neighboring blocks. Spatial neighboring blocks may be searched first and then temporal neighboring blocks may be searched. Otherwise, temporal neighboring blocks may be searched first and then spatial neighboring blocks may be searched. It is possible to search for a block coded according to temporal inter prediction in consideration of priorities of spatial neighboring blocks. Priorities of spatial neighboring blocks may be given in the order of the left neighboring block, upper neighboring block, upper right neighboring block, lower left neighboring block and upper left neighboring block.

Residual data of the second reference block may be obtained using the obtained reference view motion vector 1010 of the corresponding block (S930). The upper left of the second reference block may be detected by adding the reference view motion vector 1010 to the upper left sample of the corresponding block. Residual data may be obtained from the second reference block detected using the reference view motion vector 1010. The second reference block may be located in the same view as that of the corresponding block while belonging to a time period different from that of the corresponding block.

The reference view motion vector 1010 of the corresponding block may be obtained as a reference view motion vector 1020 of the current texture block (S940). The reference view motion vector obtained from the corresponding block of the reference view may be brought to the current view and the reference view motion vector 1010 of the corresponding block may be obtained as the reference view motion vector 1020 of the current texture block.

Residual data of the first reference block may be obtained using the reference view motion vector 1020 of the current texture block (S950). The upper left of the second reference block may be detected by adding the reference view motion vector 1020 to the upper left sample of the current texture block. Residual data may be obtained from the second reference block detected using the reference view motion vector 1020. The first reference block may be located in the same view as that of the current texture block while belonging to a time period different from that of the current texture block. The first reference block may be located in a view different from that of the second reference block while belonging to the same time period as the second reference block.

A residual data prediction value may be obtained by subtracting the residual data of the second reference block from the residual data of the first reference block (S960).

Inter-view residual prediction for decoding the current texture block may be performed using the residual data prediction value (S970).

A description will be given of conditions for applying inter-view residual prediction.

FIG. 11 illustrates an example of conditions for applying inter-view residual prediction according to the position of the first reference block detected using a reference view motion vector according to an embodiment to which the present invention is applied.

If the upper left point of the first reference block is included in a picture when a reference view motion vector, obtained from a reference view, and the upper left sample of the current texture block are summed, then residual data of the first reference block may be obtained and inter-view residual prediction may be applied. If the upper left point of the first reference block is out of the boundary of the picture when the reference view motion vector, obtained from the reference view, and the upper left sample of the current texture block are summed, then it can be determined that a region, which is concealed due to a difference between the current view and the reference view, is indicated. Accordingly, when the upper left point of the first reference block is out of the boundary of the picture, the residual data of the first reference block may be derived as 0. Otherwise, inter-view residual prediction may not be applied.

Inter-view residual prediction may be applied when a corresponding block detected using an inter-view motion vector is coded in an inter mode. When the corresponding block detected using the inter-view motion vector has been coded in an intra mode, a motion vector is not present and thus inter-view residual prediction may not be applied.

Whether to apply inter-view residual prediction may be determined by obtaining a disparity vector using depth data of the current texture block and comparing the obtained disparity vector with an inter-view motion vector. When the disparity vector is compared with the inter-view motion vector and a difference between y-direction components of the disparity vector and the inter-view motion vector is greater than a predetermined threshold value, the inter-view motion vector may not be used and inter-view residual prediction may not be applied. When the y-value of the inter-view motion vector is large, the inter-view motion vector may not be used upon determining that the possibility that the inter-view motion vector differs from the disparity vector is high, and inter-view residual prediction may not be applied.

When neighboring blocks of the current texture block include a neighboring block coded by temporal inter prediction, a motion vector of the neighboring block may be compared with a reference view motion vector and whether the reference view motion vector is applied to inter-view residual prediction may be determined. When a difference between the motion vector of the neighboring block and the reference view motion vector is less than a predetermined threshold value, the reference view motion vector may be obtained to be applied to inter-view residual prediction. When the difference between the motion vector of the neighboring block and the reference view motion vector is greater than the predetermined threshold value, the reference view motion vector may be obtained such that the reference view motion vector is not applied to inter-view residual prediction.

When the aforementioned conditions for applying inter-view residual prediction are satisfied or only some of the conditions are satisfied, inter_view_residual_prediction_flag is obtained as 1 and thus inter-view residual prediction can be applied.

When the aforementioned conditions for applying inter-view residual prediction are not satisfied or only some of the conditions are not satisfied, inter_view_residual_prediction_flag is derived as 0 and thus inter-view residual prediction is not applied.

As described above, the decoding/encoding device to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code a video signal.

The invention claimed is:

1. A method for processing a video signal by a video decoder, comprising:
    obtaining an inter-view motion vector from a neighboring block of a current texture block, the neighboring block being coded according to inter-view inter prediction, wherein the inter-view motion vector is a motion vector used for disparity compensated prediction;
    obtaining a temporal motion vector of a corresponding block using the inter-view motion vector, wherein the corresponding block is located in a reference view different from a current view including the current texture block, and wherein the temporal motion vector is a motion vector used for motion compensated prediction;
    obtaining data of a first reference block using the temporal motion vector of the corresponding block, wherein the first reference block is located in the reference view;
    obtaining a temporal motion vector of the current texture block using the temporal motion vector of the corresponding block;
    obtaining data of a second reference block using the temporal motion vector of the current texture block, wherein the second reference block is located in the current view;
    obtaining a residual data prediction value using the data of the first reference block and the data of the second reference block; and
    decoding the current texture block using the residual data prediction value.

2. The method according to claim 1, wherein the first reference block is located in a first reference picture of the reference view and the second reference block is located in a second reference picture of the current view.

3. The method according to claim 1, further comprising:
obtaining a disparity vector using a depth value of the current texture block; and
comparing the inter-view motion vector with the disparity vector,
wherein the data of the first reference block and the data of the second reference block are obtained when a difference between the inter-view motion vector and the disparity vector is less than a threshold value.

4. The method according to claim 1, further comprising:
obtaining a temporal motion vector from a neighboring block of the current texture block, the neighboring block being coded by temporal inter prediction; and
comparing the temporal motion vector of the neighboring block with the temporal motion vector of the corresponding block,
wherein the data of the first reference block and the data of the second reference block are obtained when a difference between the temporal motion vector of the neighboring block and the temporal motion vector of the corresponding block is less than a threshold value.

5. The method according to claim 1, wherein the inter-view motion vector is derived from at least one of an inter-view motion vector of a spatial neighboring block, an inter-view motion vector of a temporal neighboring block and a reference inter-view motion vector.

6. The method according to claim 5, wherein the inter-view motion vector of the spatial neighboring block has higher priority than the inter-view motion vector of the temporal neighboring block, and the inter-view motion vector of the temporal neighboring block has higher priority than the reference inter-view motion vector.

7. The method according to claim 6, wherein the reference inter-view motion vector is an inter-view motion vector corresponding to a reference view motion vector when at least one of the spatial neighboring block and the temporal neighboring block is derived using the reference view motion vector.

8. The method according to claim 1, wherein the temporal motion vector of the current texture block is set equal to the temporal motion vector of the corresponding block.

9. The method according to claim 1, wherein the residual data prediction value is obtained using a difference between the data of the first reference block and the data of the second reference block.

10. A device for processing a video signal, comprising:
a decoded picture buffer; and
an inter prediction unit coupled to the decoded picture buffer, that:
obtains an inter-view motion vector from a neighboring block of a current texture block, the neighboring block being coded according to inter-view inter prediction, wherein the inter-view motion vector is a motion vector used for disparity compensated prediction,
obtains a temporal motion vector of a corresponding block using the inter-view motion vector, wherein the corresponding block is located in a reference view different from a current view including the current texture block, and wherein the temporal motion vector is a motion vector used for motion compensated prediction,
obtains data of a first reference block using the temporal motion vector of the corresponding block, wherein the first reference block is located in the reference view,
obtains a temporal motion vector of the current texture block using the temporal motion vector of the corresponding block,
obtains data of a second reference block using the temporal motion vector of the current texture block, wherein the second reference block is located in the current view,
obtains a residual data prediction value using the data of the first reference block and the data of the second reference block, and
decodes the current texture block using the residual data prediction value.

11. The device according to claim 10, wherein the first reference block is located in a first reference picture of the reference view and the second reference block is located in a second reference picture of the current view.

12. The device according to claim 10, wherein the inter prediction unit obtains a disparity vector using a depth value of the current texture block; and compares the inter-view motion vector with the disparity vector,
wherein the data of the first reference block and the data of the second reference block are obtained when a difference between the inter-view motion vector and the disparity vector is less than a threshold value.

13. The device according to claim 10, wherein the inter prediction unit obtains a temporal motion vector from a neighboring block of the current texture block, the neighboring block being coded by temporal inter prediction; and compares the temporal motion vector of the neighboring block with the temporal motion vector of the corresponding block,
wherein the data of the first reference block and the data of the second reference block are obtained when a difference between the temporal motion vector of the neighboring block and the temporal motion vector of the corresponding block is less than a threshold value.

14. The device according to claim 10, wherein the inter-view motion vector is derived from at least one of an inter-view motion vector of a spatial neighboring block, an inter-view motion vector of a temporal neighboring block and a reference inter-view motion vector.

15. The device according to claim 14, wherein the inter-view motion vector of the spatial neighboring block has higher priority than the inter-view motion vector of the temporal neighboring block, and the inter-view motion vector of the temporal neighboring block has higher priority than the reference inter-view motion vector.

16. The device according to claim 15, wherein the reference inter-view motion vector is an inter-view motion vector corresponding to a reference view motion vector when at least one of the spatial neighboring block and the temporal neighboring block is derived using the reference view motion vector.

17. The device according to claim 10, wherein the temporal motion vector of the current texture block is set equal to the temporal motion vector of the corresponding block.

18. The device according to claim 10, wherein the residual data prediction value is obtained using a difference between the data of the first reference block and the data of the second reference block.

* * * * *